US012786691B2

(12) United States Patent
Nagarajan et al.

(10) Patent No.: US 12,786,691 B2
(45) Date of Patent: Nov. 3, 2026

(54) ANTI-REPLAY PROTECTION TECHNIQUES FOR DYNAMICALLY SHAREABLE PROFILES ON EMBEDDED UNIVERSAL INTEGRATED CIRCUIT CARDS

(71) Applicant: Apple Inc., Cupertino, CA (US)

(72) Inventors: Viswanath Nagarajan, Cupertino, CA (US); Jean-Marc Padova, San Francisco, CA (US); Ngabin S. Ng, San Diego, CA (US); Aurelien P. Raboisson, San Diego, CA (US); Didimo Raffo, San Diego, CA (US); Abishek Kumar Vaidyanathan, San Diego, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 18/900,503

(22) Filed: Sep. 27, 2024

(65) Prior Publication Data

US 2026/0095751 A1 Apr. 2, 2026

(51) Int. Cl.
*H04W 8/20* (2009.01)
*H04W 8/26* (2009.01)
*H04W 8/30* (2009.01)

(52) U.S. Cl.
CPC ........... *H04W 8/205* (2013.01); *H04W 8/265* (2013.01); *H04W 8/30* (2013.01)

(58) Field of Classification Search
CPC ..... H04W 12/06; H04W 12/04; H04W 12/08; H04W 12/35; H04W 12/068;
(Continued)

(56) References Cited

U.S. PATENT DOCUMENTS 9,615,250 B2 4/2017 Bruner et al.
12,081,969 B2 * 9/2024 Sureshlal .......... H04W 12/0431
(Continued)

FOREIGN PATENT DOCUMENTS

CN 107005836 A 8/2017
EP 3691315 A1 * 8/2020 ........... H04W 12/02
(Continued)

*Primary Examiner* — Dung Hong
(74) *Attorney, Agent, or Firm* — Brownstein Hyatt Farber Schreck, LLP

(57) ABSTRACT

A user equipment (UE), baseband processor, embedded universal integrated circuit card (eUICC), and network device (e.g., a shared profile vendor server) are described. A UE that includes an eUICC can perform transmitting, for receipt by a shared profile vendor server, a first message of a shared profile operational international mobile subscriber identity (IMSI) provisioning procedure. The first message may include a randomized IMSI. In response to the first message, the UE may receive a second message that includes an indication of a time counter value. In response to the second message, the UE may transmit, in response to determining that the time counter value is valid, a third (e.g., penultimate) message to the bootstrap vendor server. The UE may then receive in response a fourth message (e.g., final) of the shared profile operational IMSI provisioning procedure, the fourth message including a shared profile operational IMSI for the eUICC.

20 Claims, 8 Drawing Sheets

(58) Field of Classification Search
CPC ......... H04W 12/02; H04W 8/18; H04W 4/24; H04W 12/72; H04W 8/205; H04W 8/265; H04W 8/30
See application file for complete search history.

(56) References Cited

U.S. PATENT DOCUMENTS

| | | | | |
|---|---|---|---|---|
| 12,452,126 | B2 * | 10/2025 | Shakil | H04L 41/0677 |
| 2013/0012168 | A1 * | 1/2013 | Rajadurai | H04W 12/04 455/411 |
| 2013/0157673 | A1 * | 6/2013 | Brusilovsky | H04W 12/02 455/450 |
| 2016/0174069 | A1 * | 6/2016 | Bruner | H04L 63/065 455/411 |
| 2019/0087594 | A1 * | 3/2019 | Nix | G06F 21/62 |
| 2019/0281442 | A1 * | 9/2019 | Kim | H04L 63/102 |
| 2020/0186992 | A1 * | 6/2020 | Bas Sanchez | H04W 8/20 |
| 2020/0252790 | A1 * | 8/2020 | Caserta | H04W 8/06 |
| 2025/0063339 | A1 * | 2/2025 | Ahluwalia | H04W 8/20 |
| 2026/0095743 | A1 | 4/2026 | Nagarajan et al. | |

FOREIGN PATENT DOCUMENTS

| | | | | |
|---|---|---|---|---|
| GB | 2529263 | A * | 2/2016 | G06F 21/554 |
| WO | WO-2011115407 | A2 * | 9/2011 | H04W 8/265 |

* cited by examiner

ANTI-REPLAY PROTECTION TECHNIQUES FOR DYNAMICALLY SHAREABLE PROFILES ON EMBEDDED UNIVERSAL INTEGRATED CIRCUIT CARDS

TECHNICAL FIELD

This application relates generally to wireless communication systems, including systems, apparatuses, and methods for anti-replay protection techniques for securing profiles that are dynamically shared among unrelated embedded universal integrated circuit cards.

BACKGROUND

Wireless mobile communication technology uses various standards and protocols to transmit data between a network device (e.g., a base station, a radio head, etc.) and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a network device of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the network device and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A network device used by a RAN may correspond to that RAN. One example of an E-UTRAN network device is an E-UTRAN Node B (also commonly denoted as evolved Node B, enhanced Node B, eNodeB, or eNB). One example of an NG-RAN network device is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
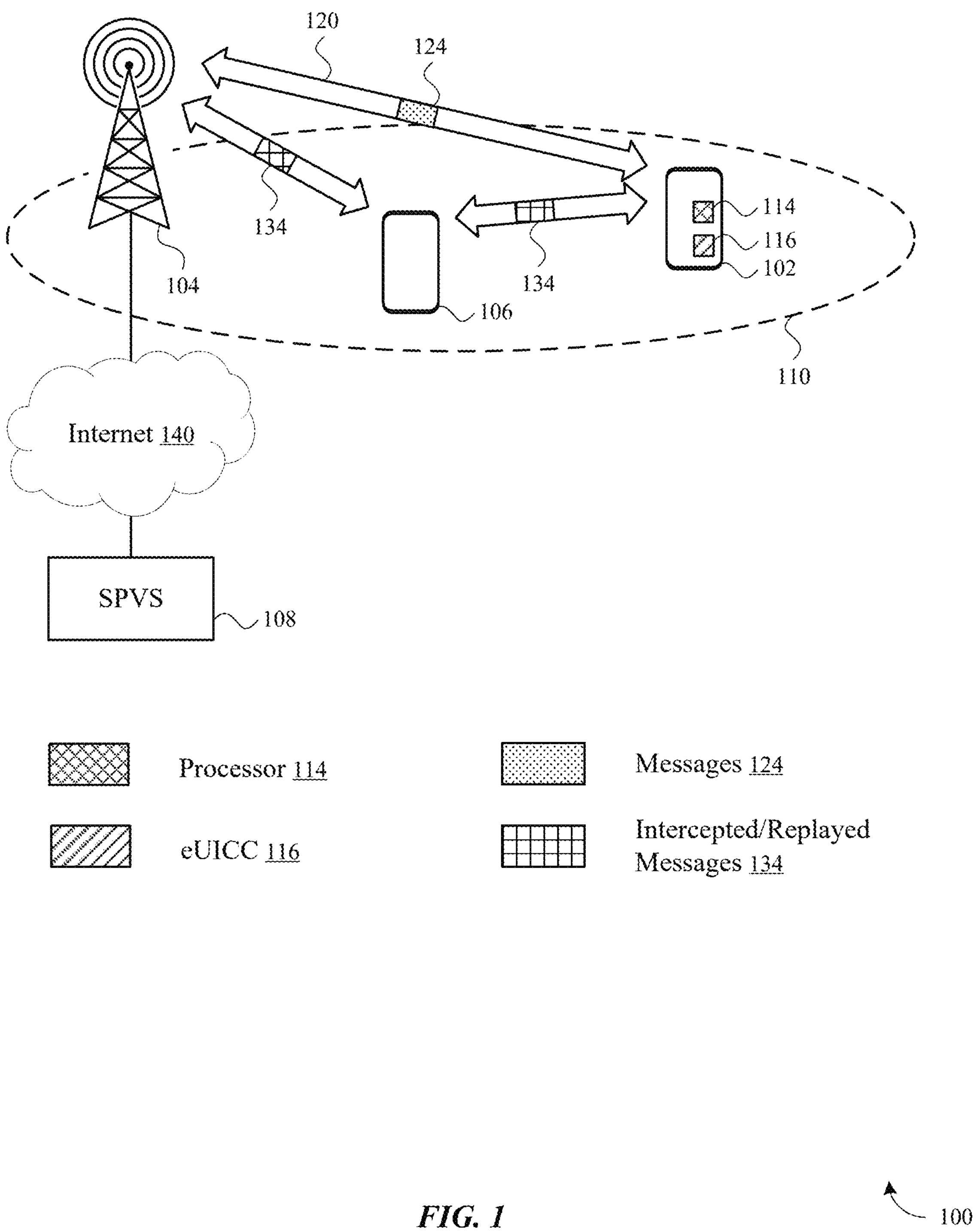
FIG. 1 shows an example wireless communication system, according to one or more aspects described herein.

Various embodiments are described with regard to a processor (e.g., baseband processor), wireless device (e.g., a user equipment (UE)), a shared profile vendor server (SPVS) (e.g., a bootstrap vendor server), or a network device. However, reference to a processor, wireless device, shared profile vendor server, or network device is merely provided for illustrative purposes. The example embodiments may be utilized with any electronic component or device that may establish a wireless connection and is configured with the hardware, software, and/or firmware to exchange information and data over the wireless connection. Therefore, the processors, wireless devices, shared profile vendor servers, and network devices described herein are used to represent any appropriate electronic components or devices.

An international mobile subscriber identity (IMSI) is a unique identifier assigned to each mobile device connected to a cellular network. The IMSI is stored on a subscriber identity module (SIM) card and used by a mobile network operator (MNO) to identify and authenticate the subscriber. The IMSI typically consists of 15 digits and is divided into three parts: the mobile country code (MCC), which represents the country of the subscriber's network; the mobile network code (MNC), which identifies the mobile network within that country; and the mobile subscriber identification number (MSIN), which uniquely identifies the subscriber within the network.

When a UE attempts to connect to a mobile network, the IMSI is transmitted to the network for authentication and to verify the subscriber's access privileges. The IMSI is integral to billing and service management, allowing network operators to associate usage with the correct subscriber for accurate billing. The IMSI can enable identification, authentication, and efficient management of subscriber services.

A network may expend significant resources managing IMSI for the various wireless devices in the network. Additionally, a maker of the wireless device may incur costs for each IMSI to be used on a network. For example, an MNO may charge the maker of the wireless device for each IMSI that is used on the wireless network of the MNO, for example due to administrative costs incurred by the MNO to manage a set of IMSI that are tied up by the wireless device maker. As such, it may be advantageous to provide shared profile operational IMSIs (op-IMSI) for wireless devices (e.g., UE), for example so that a fewer number of IMSI need to be reserved by the maker of the wireless device for use on the wireless network of the MNO. The shared profile operational IMSI may be in lieu of assigning each wireless device a static or permanent IMSI. A service provider (e.g., a shared profile vendor) may provide a service (e.g., via a SPVS) specifically to provision shared profile operational IMSI in a shared profile operational IMSI provisioning procedure (e.g., a "dynamic bootstrap" approach). Although a "bootstrap vendor server" (SPVS) may be referred to herein, the techniques described herein may be used with other servers and/or entities providing shared profile operational IMSI provisioning services to a wireless device (e.g., to a UE and/or the eUICC of a UE), and may not necessarily be referred to or be a SPVS.

While shared profile operational IMSI may reduce costs for a maker of wireless devices associated with a large quantity of IMSI, the shared profile operational IMSI provisioning procedure may present opportunities for malicious actors to obtain and reuse IMSI without authorization. A shared profile operational IMSI provision procedure may use shared profile operational IMSI credential injection through signaling proprietary to a particular vendor (e.g., the shared profile vendor providing the SPVS) using a shared profile acquisition IMSI (acq-IMSI). As further described herein, communications between an eUICC and the SPVS (or UE and SPVS, or eUICC and UE) during a shared profile operational IMSI provisioning procedure may be subject to a man-in-the-middle (MITM) type attack. The MITM attack may be generally performed by capturing acq-IMSI signaling between an eUICC and the SPVS that injects an op-IMSI. The MITM may then replay the same signaling at a later time to the same eUICC for the purpose of stealing that op-IMSI without the knowledge of the SPVS. The MITM may then hold on to the op-IMSI, in some cases indefinitely.

From the perspective of device makers or other entities that pay for the use of the op-IMSI, such MITM attacks may increase costs through the unauthorized use of the op-IMSI that has been paid for. From the perspective of the MNO (e.g., a temporary MNO (t-MNO) carrier network), each op-IMSI should not be reused on the MNO simultaneously, and such unauthorized use may result in errors in provisioning or managing wireless devices, or other undesired network operations. Techniques to more securely perform a shared profile operational IMSI provisioning procedure are thus desired, for example that reduce or eliminate MITM attacks for shared profile operational IMSI provisioning procedures for an eUICC.

Techniques for anti-replay protection techniques for eUICCs are described herein. As further described herein, a SPVS maintains a time counter (e.g., the global time counter (GTC) described herein), and provides a time counter value during a shared profile operational IMSI provisioning procedure. An eUICC may receive a request for a randomized acq-IMSI, for example from a baseband processor of a UE, and transmit the randomized acq-IMSI responsive to the request. In response to a message transmitted to the SPVS that includes the randomized acq-IMSI, the eUICC may receive back a time counter value and a nonce value (which may also be referred to as just a "nonce"). The eUICC may determine whether the time counter value is valid, and may continue the shared profile operational IMSI provisioning procedure if the value is valid. The eUICC may exchange one or more additional messages of the procedure, and then receive the shared profile operational IMSI for the eUICC. If the eUICC determines that the time counter value is invalid, as further described herein, the eUICC may provide a message (e.g., a failure message) that terminates the shared profile operational IMSI provisioning procedure.

The techniques described herein may provide a more secure mechanism to provision shared profile operational IMSI to a eUICC, including from a SPVS in connection with a shared profile operational IMSI provisioning procedure. In some examples, the use of a time counter value provided during provisioning may increase detection of attempted MITM attacks, and reduce unauthorized use of shared profile operational IMSI.

FIG. 1 shows an example wireless communications system 100, according to one or more aspects described herein. In one or more embodiments, wireless communications system 100 supports one or more aspects of anti-replay protection techniques for embedded universal integrated circuit cards, as further described herein.

Wireless communications system 100 includes a UE 102, a network device 104, and a SPVS 108. In some examples, the SPVS 108 may be operated by a third-party external to the wireless communications system 100. For example, the network device 104 may be in electronic communication with the SPVS 108 via the Internet 140. An MITM device 106 may be a device that pursues a MITM attack, listening for and replaying the messages 134 intended to be transmitted between the network device 104 and the UE 102.

In one or more embodiments, UE 102 is associated with a universal SIM (USIM), such as an eUICC 116. In some cases, the combination of the UE 102 and eUICC 116 may be referred to as a mobile station (MS). In other cases, a component of UE 102 is also a component of the MS. In one or more embodiments, the eUICC 116 may allow a user (e.g., a user of the UE 102) to choose between multiple MNO profiles. In some embodiments, the eUICC 116 may be a discrete chip or integrated circuit component, for example mounted on a printed circuit board of the UE 102. In other embodiments, the eUICC 116 may be incorporated into an integrated circuit chip, module, or assembly with other components or circuits of UE 102, such as a modem or baseband.

In some cases, UE 102 may seek to establish a connection 120 with the network device 104 of an MNO and needs a shared profile operational IMSI to communicate in the network. Generally, the network of the MNO needs to authenticate the UE 102, and specifically the USIM of the UE 102. The UE 102 provides an IMSI (e.g., an acq-IMSI) to the network, which authenticates the UE 102. In the case of an op-IMSI provided by a MNO in a shared profile operational IMSI provisioning procedure, the eUICC 116, via the UE 102, provides to the SPVS 108, an acq-IMSI in one or more messages 124 via the connection 120 with the network device 104. The network device 104 of the network maintains a communication link with the SPVS 108, which may be through the Internet 140 in some examples. In some examples, the network device 104 may have a connection with the SPVS 108 via one or more intermediate devices, which may be via the Internet 140 or via another connection type.

In one or more embodiments, the SPVS 108 maintains a time counter, which may be a GTC. In some examples, the SPVS 108 may maintain a single GTC for all the eUICCs for whom the SPVS 108 provides a shared profile operational IMSI (which may also be referred to as shared profile operational IMSI credentials herein). That is, the SPVS 108 may provide a time counter value to each eUICC 116, which may be part of various UE 102, during a shared profile operational IMSI provisioning procedure for those eUICC 116. In some embodiments, the time counter value may increment according to a known resolution (e.g., periodicity or schedule). For example, the time counter value may increment according to a preconfiguration duration of a certain quantity of seconds or minutes (Tgtc_duration). The SPVS 108 may then provide the GTC (the time counter value) to any eUICC that initiates acq-IMSI signaling for the purpose of acquiring op-IMSI credentials. The time counter value may be provided to the eUICC 116 via the network device 104 and UE 102 over the connection 120.

In some embodiments, in addition to the time counter value, the SPVS 108 provides a nonce. A nonce value (or just "nonce") may be provided in a same message as the time counter value. The time counter value and nonce value that are provided together may collectively be a tuple, and may be referred to as a time counter-nonce tuple or time counter value-nonce value tuple.

In one or more embodiments, the eUICC 116 maintains a history (e.g., log, record) of time counter values received from the SPVS 108. In some embodiments, the eUICC 116 may be configured to store a time counter value (C), and up to a threshold quantity (M) of instances of tuples of acq-IMSI and nonce values, with each tuple corresponding to a device-initiated (e.g., initiated by UE 102) acq-IMSI signaling with the SPVS 108. In some examples, the value of M may be based on protocol design parameters established between devices containing an eUICC 116 (e.g., UE 102) and the SPVS 108. The value of M may be for a particular validity period (e.g., resolution), such as Tgtc_duration, for the time counter value.

In one or more embodiments, the SPVS 108 may run a clock to generate the time counter values, but the UE 102 and/or eUICC 116 need not validate the received time counter value, for example against a local clock at the UE 102 and/or eUICC 116. In some cases, the UE 102 and/or eUICC 116 may not be able to guarantee that a local time (against which the time counter value would be compared) is correct in the absence of network connectivity for the UE 102 and/or eUICC 116, or in the presence of a MITM attack because MITM device 106 may interfere with the accuracy of the time (e.g., by deliberately providing incorrect or inaccurate time counter values).

The eUICC 116 may add each tuple immediately (e.g., before a next message following M2) after receiving and successfully decoding a second message (e.g., M2), which may thwart MITM attacks. The message received at the eUICC 116 may be encoded (encrypted and/or integrity protected) according to a key known to the SPVS 108 and the eUICC 116, such that the tuple may be stored after the received M2 message is received. In one or more embodiment, the MITM device 106 may be unable to arbitrarily bump up the time counter value in a second message (e.g., GTC in M2) since the second message (M2) is protected with the key that is known only to eUICC 116 and SPVS 108.

When receiving signaling via the UE 102 (transmitted from the SPVS 108), the eUICC 116 may first check for validity of the time counter value provided during acq-IMSI signaling. As further described herein, the eUICC 116 may check certain conditions, and only accept a message with a time counter value if at least one of the conditions are met. If at least one of the following three conditions are not met, then the eUICC 116 can reject the signaling on the grounds that the signaling may be in connection with a replay attack.

First, the eUICC 116 accepts the message if the eUICC 116 does not have a prior history for a time counter value (e.g., there is not a time counter value already recorded at the eUICC 116).

Second, the eUICC 116 if the provided time counter value is a more recent one than the last recorded by eUICC 116.

Third, if the provided time counter value is the same as the last recorded time counter value at the eUICC 116 but fewer than a threshold number (M) quantity of nonce values have been provided by the SPVS 108 and recorded at the eUICC 116 for the same time counter value, and the nonce value received with the time counter value does not match any of the nonce values already recorded at the eUICC 116. In some embodiments, for example depending on a capability of the eUICC 116, the eUICC 116 may determine that no more than a threshold duration (e.g., Tgtc_duration) has elapsed since the time of reception of the first nonce value recorded at the eUICC 116 for the same time counter value. In some cases, such checks against the threshold duration at the eUICC 116 may prevent the use by a MITM device 106 of a newly-attempted nonce value for a same time counter value, even in the case that fewer than the threshold number (M) quantity of nonce values have been provided by the SPVS 108 and recorded at the eUICC 116.

The MITM device 106 may attack a shared profile operational IMSI provisioning procedure in various ways that may be addressed by the techniques described herein. One example of an MITM attack type is a payload replay substitution attack, where the MITM device 106 receives and records a message 134, then retransmits such message 134. In particular, the MITM device 106 may first have a recording session from a particular eUICC 116 originating a dynamic bootstrap acquisition session using a specific acq-IMSI. The MITM device 106 may then replay messages (e.g., from M2 through Mf) at a later point in time when the same eUICC 116 originates (or is coaxed to originate) a dynamic bootstrap acquisition session using the same acq-IMSI).

One aspect of preventing attacks by an MITM device 106 during a shared profile operational IMSI provisioning procedure is for the eUICC 116 to add (e.g., store, record, log) a received tuple (e.g., acq-IMSI, nonce value) as soon as possible after the nonce value is received (e.g., in an M2 message). For example, the M2 nonce value should be added before completion of the successful acq-IMSI signaling, as opposed to after the process is complete.

Figure 2:
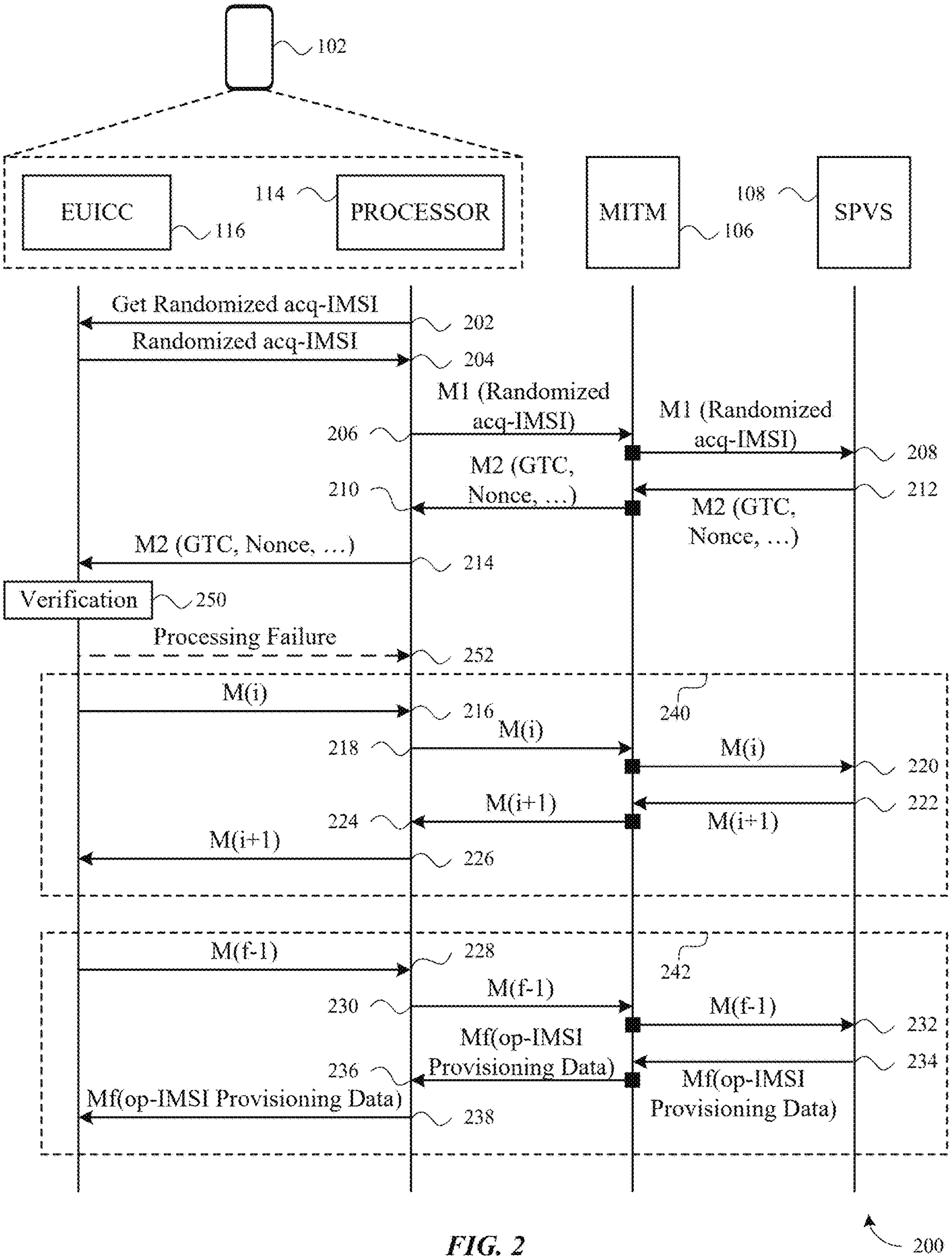
FIG. 2 shows an example communications flow, according to one or more aspects described herein.

FIG. 2 shows an example communications flow 200, according to one or more aspects described herein. In one or more embodiments, communications flow 200 supports one or more aspects of anti-replay protection techniques for embedded universal integrated circuit cards, as further described herein. Generally, communications flow 200 shows a shared profile operational IMSI provisioning procedure, including recording by a MITM device 160 during a recording phase of a MITM attack.

A processor 114 (e.g., a baseband processor) of the UE 102 may send a message 202 to the eUICC 116 requesting a randomized acq-IMSI as a first part of a shared profile operational IMSI provisioning procedure (e.g., a dynamic bootstrap acquisition session). The eUICC 116 then provides the randomized acq-IMSI in a message 204. The processor 114 (e.g., via the UE 102) then sends an M1 message 206 that include the randomized acq-IMSI to the SPVS 108 as message 208. In the context of the communications flow described herein (including communications flow 200), messages exchanged between the UE 102 and the SPVS 108 may be transmitted and received via a network device 104 and/or one or more intermediate communication devices, even if not shown. The SPVS 108 receives the M1 message 208 with the randomized acq-IMSI. In an attack by the MITM device 106, the message 206 may be recorded by the MITM device 106.

In response to the M1 message 208, the SPVS 108 provides a time counter value (e.g., GTC) for the eUICC 116, along with a corresponding nonce value, in an M2 message 212. In an attack by the MITM device 106, the M2 message 212 may be recorded by the MITM device 106. The UE 102 may receive the M2 message 210, for example at the processor 114, and provide the M2 message 214 to the eUICC 116.

In one or more embodiments, the M2 message 214 may be encoded with a key known to the eUICC 116 and the SPVS 108. In some cases, the eUICC 116 knows a first key of a key pair and the SPVS 108 knows a second key of the key pair. In one or more embodiments, the key pairs may be distributed prior to the communications flow 200. The eUICC 116 may decode (decrypt) the M2 message 214 using the first key at verification 250, and obtain the time counter value and nonce value.

In one or more embodiments, verification 250 includes checking, by the eUICC 116, whether the eUICC 116 has previously recorded (logged) a tuple of the nonce value for the indicated time counter value and associated acq-IMSI. In the case that the eUICC 116 does not have a record of the tuple, then the eUICC 116 records (logs or otherwise maintains a history of) the tuple (nonce value and acq-IMSI) for the time counter value, and the shared profile operational IMSI provisioning procedure (e.g., communications flow 200) is allowed to proceed. In the case that the eUICC 116 does have a record of the tuple already (a same acq-IMSI and nonce value for the same time counter value), the shared profile operational IMSI provisioning procedure halts. In one or more embodiments, a processing failure message 252 may be provided to the processor 114 in the case that verification 250 does not pass.

The M2 message 214 includes a time counter value (e.g., GTC) and a nonce value. In some examples, the eUICC 116 may record, in a history buffer, a time counter value, and a corresponding list or set of tuples (each tuple including an acq-IMSI and nonce value). If, at a future time, at verification 250 the eUICC 116 receives an M2 message 214 with a different time counter value, the eUICC 116 may then begin to record tuples associated with that next time counter value (e.g., after the time counter value has been incremented by one or more by the SPVS 108), and the prior records (e.g., records associated with the prior time counter value) may be evicted, erased, overwritten, or otherwise no longer kept as a record.

In some cases, for verification 250, the eUICC 116 may already have one or more tuples recorded for a first time counter value. If the M2 message indicates an earlier time counter value than the first time counter value, the shared profile operational IMSI provisioning procedure may halt, and a processing failure message 252 may be provided to the processor 114. Such earlier time counter value, after the SPVS 108 has already incremented the time counter value, may indicate an attack by the MITM device 106.

In some cases, for verification 250, the eUICC 116 may have recorded a certain quantity of tuples for a particular time counter value. In such case, if the M2 message 214 includes a tuple for the time counter value that exceeds an allowable threshold, the eUICC 116 may fail verification 250. In particular, such failure of verification may be indicated (e.g., via processing failure message 252) because a MITM device 106 may attempt multiple nonce values as part of the MITM attack.

In one or more embodiments, for verification 250, the eUICC 116 may have recorded a certain quantity of tuples for a particular, first time counter value. At some later time, an M2 message 214 may include a tuple for the new time counter value (e.g., for a second time counter value, or newer GTC). In such cases, at verification 250, the eUICC 116 may erase, overwrite, or otherwise no longer keep the record of tuples associated with the first time counter value (e.g., the earlier, older GTC). As in the case where a time counter value is new, as discussed above, the eUICC 116 may then proceed to record tuples associated with the second, new time counter value.

Where verification 250 fails, and a processing failure message 252 is sent, the shared profile operational IMSI provisioning procedure may be halted or otherwise stopped for that set of signaling starting with the first request for the randomized acq-IMSI of a message 202. However, in one or more embodiments, the eUICC 116 may maintain the already-recorded history of tuples associated with a time counter value in order to be able to detect any future MITM attacks.

Following the acq-IMSI signaling, and upon verification of the time counter value at 250, the communications flow 200 may perform signaling in an intermediate phase 240, which may include messages (e.g., message 216, message 218, message 220, message 222, message 224, and message 226) sent between the eUICC 116 and the SPVS 108 that may be recorded by the MITM device 106 listening on a path between the UE 102 and the SPVS 108.

In a final phase 242, the communications flow 200 may include the provision of shared profile operational IMSI (op-IMSI). A message 228 is sent to the processor 114, which is then transmitted to the SPVS 108 as message 230. The MITM device 106 may record the message 230 for a later replay attack. The SPVS 108 receives message 232 and provide a message that includes provisioning data for the op-IMSI, including the op-IMSI, in message 234. The MITM device 106 may record the message 234 for a later replay attack. The UE 102 receives message 236 that includes the op-IMSI provisioning data, and provides the op-IMSI provisioning data to the eUICC 116 in a message 238. The shared profile operational IMSI provisioning procedure may be complete at this point. Note that the MITM device 106 may have recorded messages along the way.

Figure 3:
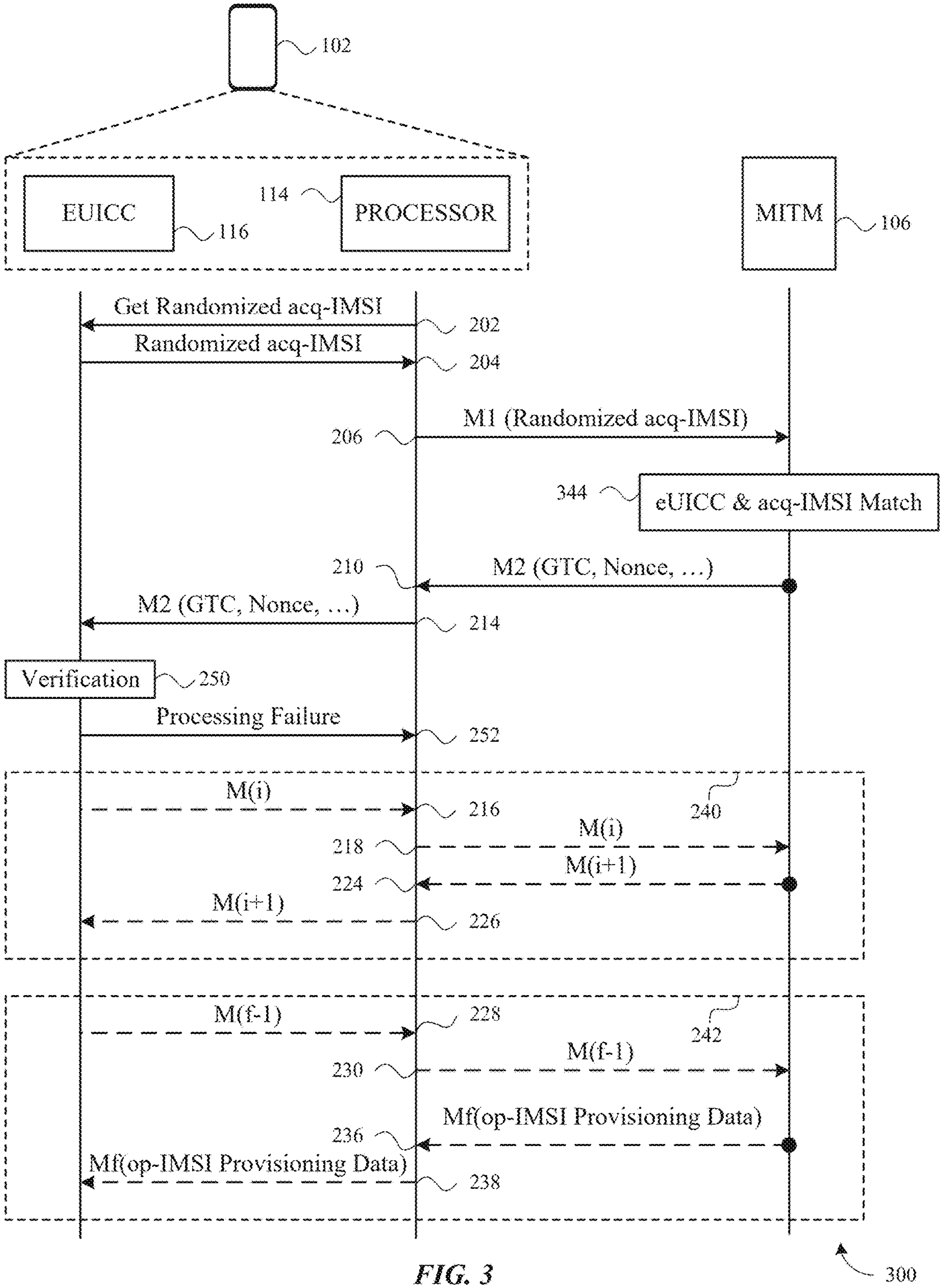
FIG. 3 shows an example communications flow, according to one or more aspects described herein.

FIG. 3 shows an example communications flow 300, according to one or more aspects described herein. In one or more embodiments, communications flow 300 supports one or more aspects of anti-replay protection techniques for embedded universal integrated circuit cards, as further described herein. Generally, communications flow 300 shows a shared profile operational IMSI provisioning procedure, including playback by a MITM device 160 during a playback phase of a MITM attack, where the eUICC 116 may be in or otherwise already a part of a UE 102.

During an attack, as shown, the communications flow 300 appears substantially the same from the perspective of the UE 102 as the communications flow 200. The processor 114, via the UE 102, may transmit an M1 message 206 to a SPVS 108, which is received by the MITM device 106. The MITM device 106 may have previously recorded messages from the same eUICC 116, as previously discussed. If the MITM device 106 determines at an evaluation 344 that the MITM device 106 has previously recorded a session corresponding to the same eUICC 116 and acq-IMSI, then the MITM device 106 may proceed with a MITM attack by replaying messages from the previously recorded session. As such, the MITM may transmit to the eUICC 116 (e.g., via the UE 102)

a previously-recorded version of the M2 message 210, as well as message 224 responsive to received message 218 (of which there may be multiple messages) during the intermediate phase 240, and then provide op-IMSI provisioning data in a message 236 response to a message 230 in a final phase 242.

In the above discussion of the MITM attack by the MITM device 106, the attack may be thwarted at verification 250, as further discussed herein. That is, where verification 250 is performed in response to the M2 message in the context of an MITM attack by the MITM device 106, verification fails and the processing failure message 252 is provided to the processor 114.

Figure 4:
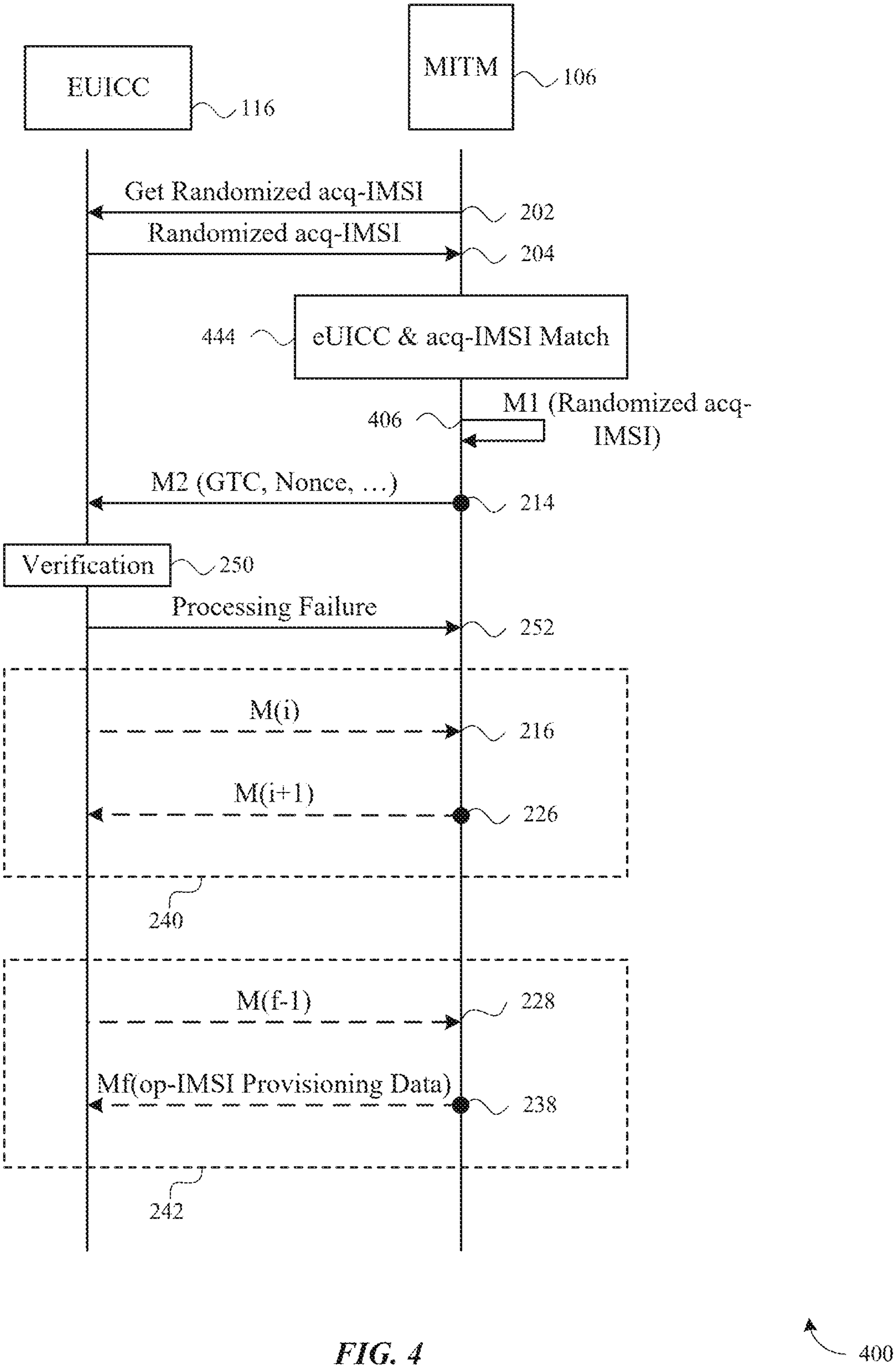
FIG. 4 shows an example communications flow, according to one or more aspects described herein.

FIG. 4 shows an example communications flow 400, according to one or more aspects described herein. In one or more embodiments, communications flow 400 supports one or more aspects of anti-replay protection techniques for embedded universal integrated circuit cards, as further described herein. Generally, communications flow 400 shows a shared profile operational IMSI provisioning procedure, including playback by a MITM device 160 during a playback phase of a MITM attack, where the eUICC 116 may be extracted from or otherwise not in a UE 102.

During an attack, as shown, the communications flow 400 appears substantially the same from the perspective of the eUICC 116 as the communications flow 200. The MITM device 106 may provide the message 202 to the eUICC 116 requesting a randomized acq-IMSI as a first part of a shared profile operational IMSI provisioning procedure (e.g., a dynamic bootstrap acquisition session). The eUICC 116 may respond with the requested randomized acq-IMSI from the eUICC 116 in a message 204. The MITM device 106 may have previously recorded messages from the same eUICC 116, similar to the recorded messages as previously discussed with reference to the communications flows 300. If the MITM device 106 determines at an evaluation 444 that the MITM device 106 has previously recorded a session corresponding to the same eUICC 116 and acq-IMSI, then the MITM device 106 may proceed with a MITM attack by replaying messages from a previously recorded session. As such, the MITM may consider it as equivalent to having received an M1 message 406 based on the randomized acq-IMSI and provide to the eUICC 116 a previously-recorded version of the M2 message 214, as well as message 226 responsive to received message 216 (of which there may be multiple messages) during the intermediate phase 240, and then provide op-IMSI provisioning data in a message 238 response to a message 228 in a final phase 242.

In the above discussion of the MITM attack by the MITM device 106, the attack may be thwarted at verification 250, as further discussed herein. That is, where verification 250 is performed in response to the M2 message in the context of an MITM attack by the MITM device 106, verification fails and the processing failure message 252 is provided to the MITM 106.

Figure 5:
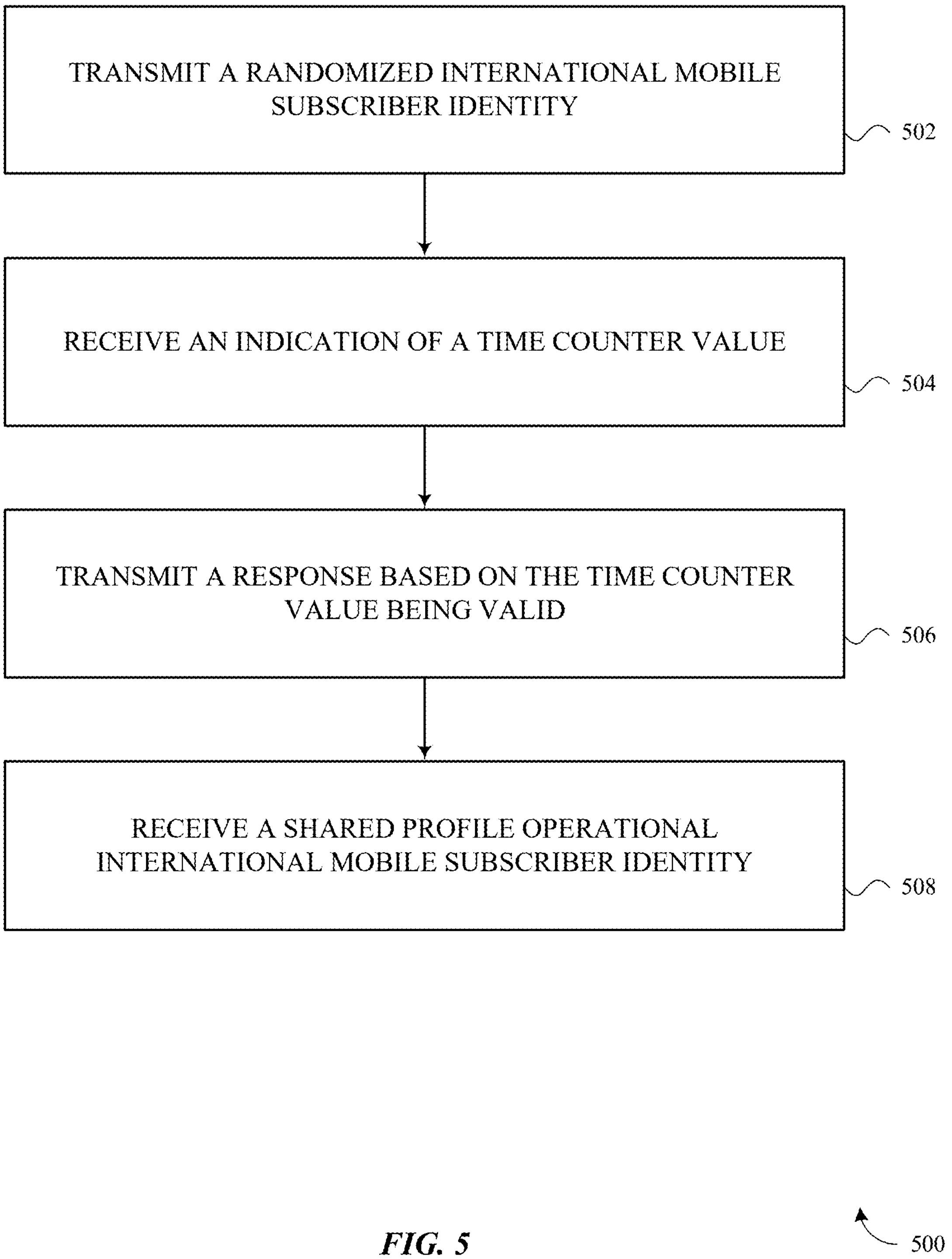
FIG. 5 shows an example method of wireless communication by a UE, according to one or more aspects described herein.

FIG. 5 shows an example method 500 of wireless communication by a UE, according to one or more aspects described herein. In some cases, the UE may be the wireless device 802 or UE 102. In some cases, the method 500 may be performed by a baseband processor of the UE. In some embodiments, the baseband processor may include one or more processor cores, and memory that is coupled to the processor core(s). The memory may store instructions that, when executed by the processor core(s), causes the baseband processor to perform the operations of the method 500. As the baseband processor performs the operations of the method 500, the baseband processor may also cause other components of the UE to perform, or discontinue, various operations.

At 502, the method 500 includes transmitting a randomized IMSI (e.g., a randomized acq-IMSI). In some embodiments, the method 500 includes transmitting, for receipt by a SPVS, a first message of a shared profile operational IMSI provisioning procedure, that includes a randomized IMSI for an eUICC.

At 504, the method 500 includes receiving an indication of a time counter value. In some embodiments, the method 500 includes receiving, at least in part in response to the first message, a second message of the shared profile operational IMSI provisioning procedure, the second message comprising an indication of a time counter value and a first nonce value.

At 506, the method 500 includes transmitting a response based on the time counter value being valid. In some embodiments, the method 500 includes transmitting, at least in part in response to the time counter value determined to be valid and for receipt by the SPVS, a third message of the shared profile operational IMSI provisioning procedure.

At 508, the method 500 includes receiving a shared profile operational IMSI for the eUICC. In some embodiments, the method 500 includes receiving, at least in part in response to the third message, a fourth message of the shared profile operational IMSI provisioning procedure, the fourth message comprising a shared profile operational IMSI for the eUICC. In some examples, the third message may a penultimate message of the provisioning procedure. In some examples, the fourth message may a final (e.g., ultimate) message of the provisioning procedure.

In some embodiments, the third message is a penultimate message and the fourth message is a final message of the shared profile operational IMSI provisioning procedure.

In one or more embodiments, the method further includes receiving, prior to the first message being received, an indication of a second time counter value; comparing the indicated time counter value with the second time counter value to determine whether the indicated time counter value is valid; and determining, based at least in part on the indicated time counter value being older than the second time counter value, that the shared profile operational IMSI provisioning procedure has failed.

In some embodiments, the second message further includes a first nonce value associated with the time counter value. In one or more embodiments, the method further includes comparing the indicated time counter value and the first nonce value with a second time counter value and a second nonce value received at the UE prior to transmitting the first message; and obtaining a failure message that indicates that the indicated time counter value is invalid based at least in part on both the first nonce value and the second nonce value having a same value. In one or more embodiments, the method further includes obtaining a failure message that indicates that the indicated time counter value and the first nonce value are invalid based at least in part on a threshold quantity of time counter value-nonce value tuples having been exceeded.

In one or more embodiments, the method further includes providing, to the eUICC, the indication of the time counter value; and obtaining, from the eUICC and in response to the provided indication of the time counter value, the third message of the shared profile operational IMSI provisioning procedure, the eUICC having determined that the time counter value is valid.

In some embodiments, the SPVS generates the time counter value, the time counter value globally applicable to a population of eUICCs, including the eUICC. In some embodiments, the SPVS may maintain a time counter value specific to an acq-IMSI or a range of acq-IMSIs, and may provide the time counter value to the eUICC that used that acq-IMSI.

The method 500 may be variously embodied, extended, or adapted, as described in the following paragraphs and elsewhere in this description.

Figure 6:
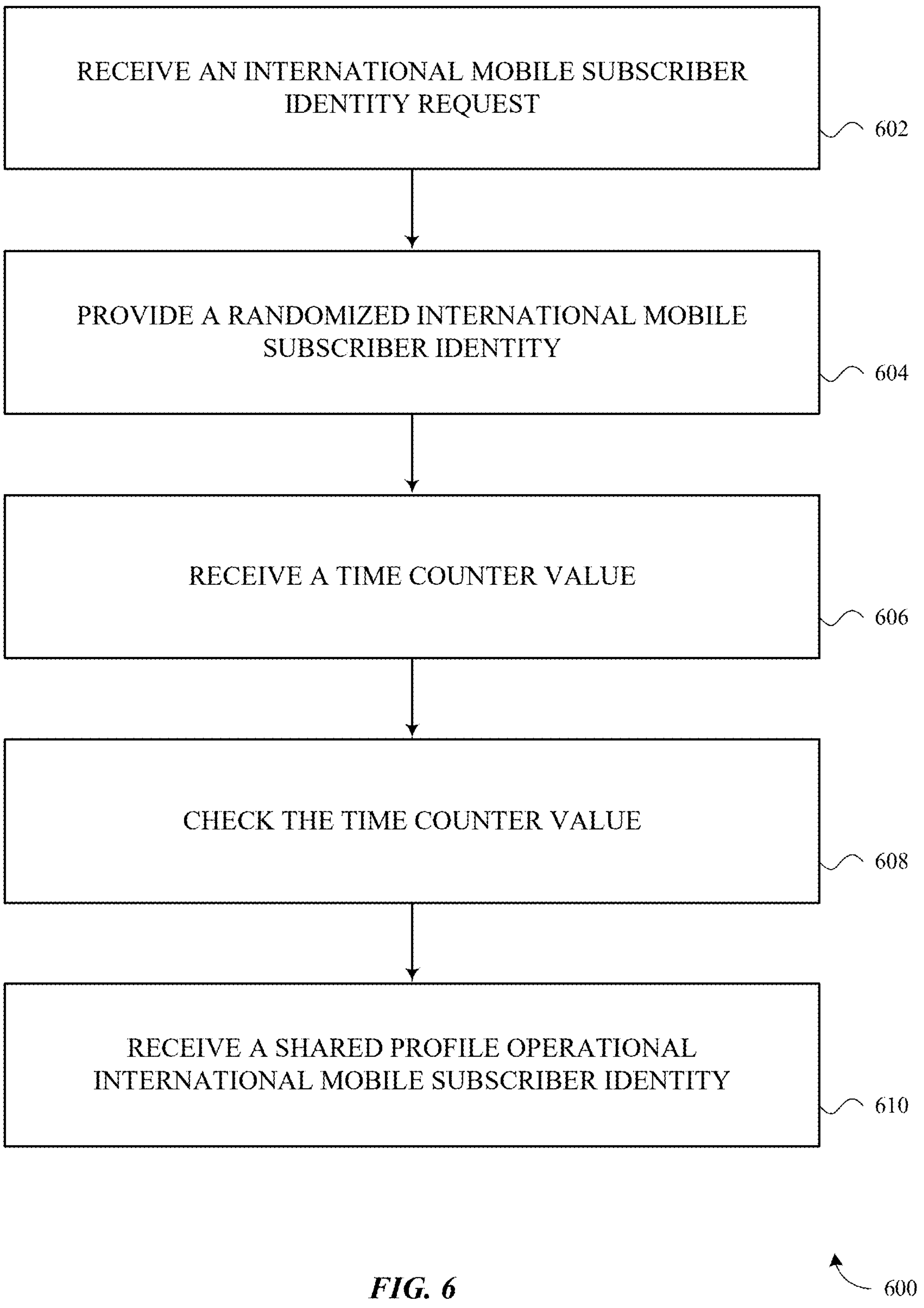
FIG. 6 shows another example method of wireless communication at an embedded universal integrated circuit card (eUICC), according to one or more aspects described herein.

FIG. 6 shows an example method 600 of wireless communication at an eUICC, according to one or more aspects described herein. In one or more embodiments, method 600 supports one or more aspects of anti-replay protection techniques for eUICCs, as further described herein. In some cases, the eUICC may be the eUICC 116, eUICC 818, or one of the other network devices described herein. The method 600 may be performed using a processor, or other components of the eUICC.

At 602, the method 600 includes receiving an IMSI request. In some embodiments, the method 600 includes receiving a request for a randomized IMSI (e.g., a randomized acq-IMSI).

At 604, the method 600 includes providing a randomized IMSI. In some embodiments, the method 600 includes transmitting a randomized IMSI responsive to the request.

At 606, the method 600 includes receiving a time counter value. In some embodiments, the method 600 includes receiving, at least in part in response to the request for the randomized IMSI, an indication of a time counter value and a first nonce value associated with a shared profile operational IMSI provisioning procedure.

At 608, the method 600 includes checking the time counter value. In some embodiments, the method 600 includes determining whether the time counter value and the first nonce value are valid. In one or more embodiments, the method further includes determining, based at least in part on the time counter value and the first nonce value, whether a message comprising the indication of the time counter value and the first nonce value is accepted for processing. In one or more embodiments, the method further includes determining, based at least in part on the acceptance of the second message for processing, whether the subsequent messages should be generated or accepted for processing.

At 610, the method 600 includes receiving a shared profile operational IMSI. In some embodiments, the method 600 includes receiving, based at least in part on a determination that the time counter value is valid, a shared profile operational IMSI for the eUICC.

In one or more embodiments, the method further includes comparing the indicated time counter value with a second time counter value stored at the eUICC prior to the receipt of the request for the randomized IMSI; determining that the indicated time counter value is invalid based at least in part on the indicated time counter value being older than the second time counter value; and transmitting a failure message that indicates that the indicated time counter value is invalid.

In one or more embodiments, the method further includes receiving a first nonce value with the indication of the time counter value. In one or more embodiments, the method further includes comparing the indicated time counter value and the first nonce value with a second time counter value and a second nonce value stored at the eUICC prior to the receipt of the request for the randomized IMSI; determining that the indicated time counter value is invalid based at least in part on both the first nonce value and the second nonce value having a same value, and the indicated time counter value and the second time counter value having a same value; and transmitting a failure message that indicates that the indicated time counter value is invalid. In one or more embodiments, the method further includes determining, based at least in part on receiving the indicated time counter value and the first nonce value, that a threshold quantity of time counter value-nonce value tuples has been exceeded; determining that the indicated time counter value is invalid based at least in part on the threshold quantity of time counter value-nonce value tuples having been exceeded; and transmitting a failure message that indicates that the indicated time counter value is invalid.

In one or more embodiments, the method further includes transmitting, based at least in part on the determination that the time counter value is valid, a message for receipt by a SPVS; and receiving, at least in part in response to the transmitted message, the shared profile operational IMSI from the SPVS.

In one or more embodiments, the method further includes receiving a plurality of messages associated with the shared profile operational IMSI provisioning procedure and including a plurality of tuples, each message including, of the plurality of tuples, a tuple of a time counter value and a nonce value for the message; storing the plurality of tuples at the eUICC; and comparing the time counter value with the plurality of tuples to determine whether the time counter value is valid.

In one or more embodiments, the method further includes obtaining a first key of a key pair, where a second key of the key pair is known to a SPVS that provides the shared profile operational IMSI; and decrypting, by the eUICC and using the first key, a message that includes the indication of the time counter value associated with the shared profile operational IMSI provisioning procedure to obtain the time counter value.

The method 600 may be variously embodied, extended, or adapted, as described in the following paragraphs and elsewhere in this description.

Embodiments contemplated herein include one or more non-transitory computer-readable media storing instructions to cause an electronic device, upon execution of the instructions by one or more processors of the electronic device, to perform one or more elements of the method 500 or 600. In the context of method 500, this non-transitory computer-readable media may be, for example, a memory of a UE (such as a memory 806 of a wireless device 802 that is a UE, as described herein). In the context of method 600, this non-transitory computer-readable media may be, for example, a memory of a eUICC (such as eUICC 818, as described herein).

Embodiments contemplated herein include an apparatus having logic, modules, or circuitry to perform one or more elements of the method 500 or 600. In the context of method 500, this apparatus may be, for example, an apparatus of a UE (such as a wireless device 802 that is a UE). In the context of method 600, this apparatus may be, for example, an apparatus of an eUICC (such as eUICC 818, as described herein).

Embodiments contemplated herein include an apparatus having one or more processors and one or more computer-readable media, using or storing instructions that, when executed by the one or more processors, cause the one or more processors to perform one or more elements of the method 500 or 600. In the context of method 500, this apparatus may be, for example, an apparatus of a UE (such as a wireless device 802 that is a UE, as described herein).

In the context of the method 600, this apparatus may be, for example, an apparatus of an eUICC (such as eUICC 818, as described herein).

Embodiments contemplated herein include a signal as described in or related to one or more elements of the method 500, or 600.

Embodiments contemplated herein include a computer program or computer program product having instructions, wherein execution of the program by a processor causes the processor to carry out one or more elements of the method 500 or 600. In the context of method 500, the processor may be a processor of a UE (such as a processor(s) 804 of a wireless device 802 that is a UE, as described herein), and the instructions may be, for example, located in the processor and/or on a memory of the UE (such as a memory 806 of a wireless device 802 that is a UE, as described herein). In the context of method 600, the processor may be a processor of an eUICC (such as a processor of the eUICC 818, as described herein), and the instructions may be, for example, located in the processor and/or on a memory of the eUICC (such as a memory of the eUICC 818, as described herein).

Figure 7:
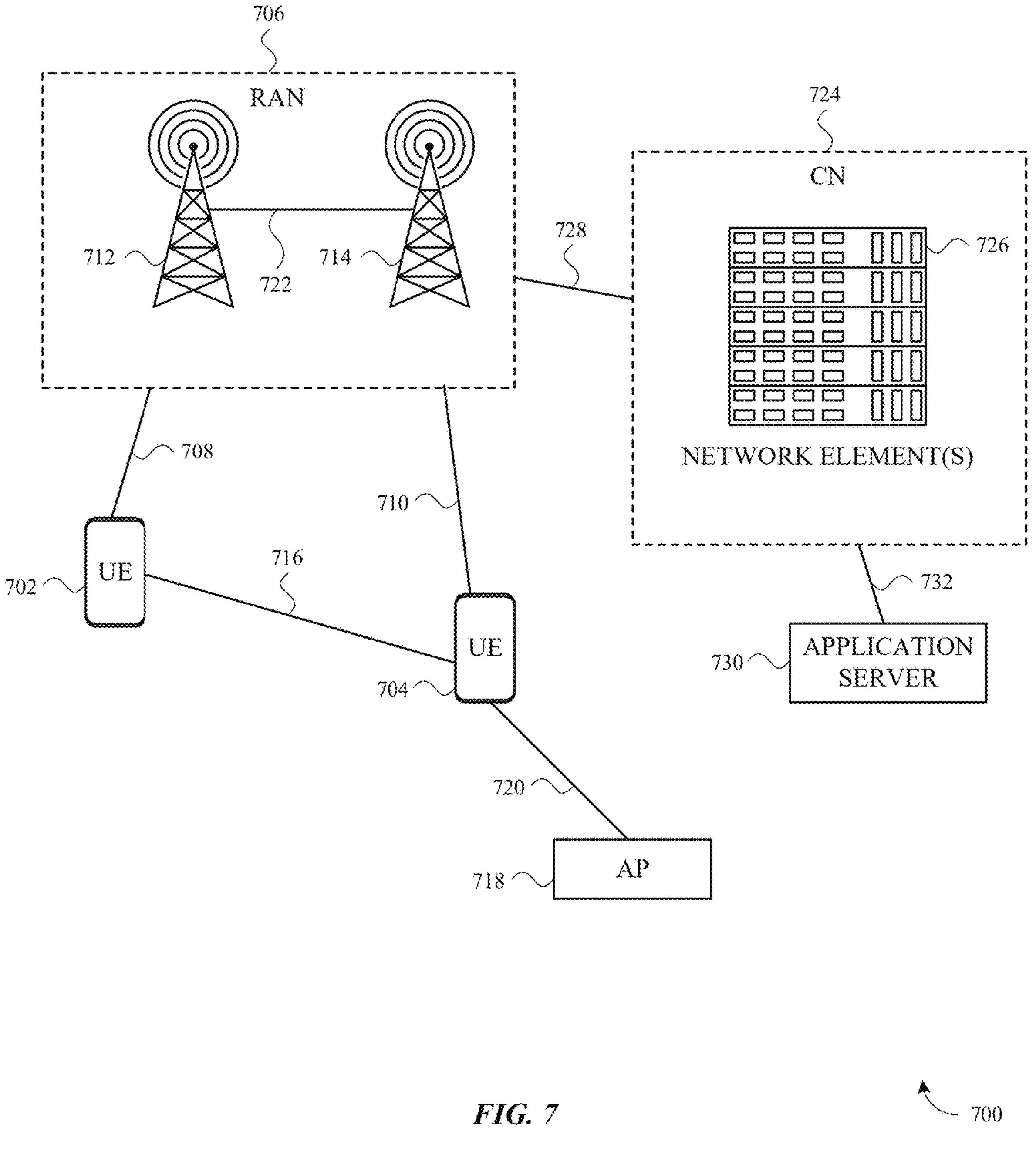
FIG. 7 illustrates an example architecture of a wireless communication system, according to one or more aspects described herein.

FIG. 7 illustrates an example architecture of a wireless communication system, according to embodiments described herein. The following description is provided for an example wireless communication system 700 that operates in conjunction with the LTE system standards or specifications and/or 5G or NR system standards or specifications, as provided by 3GPP technical specifications.

As shown, the wireless communication system 700 includes UE 702 and UE 704 (although any number of UEs may be used). In this example, the UE 702 and the UE 704 are illustrated as smartphones (e.g., handheld touchscreen mobile computing devices connectable to one or more cellular networks) but may also comprise any mobile or non-mobile computing device configured for wireless communication.

The UE 702 and UE 704 may be configured to communicatively couple with a RAN 706. In some embodiments, the RAN 706 may be NG-RAN, E-UTRAN, etc. The UE 702 and UE 704 utilize connections (or channels) (shown as connection 708 and connection 710, respectively) with the RAN 706, each of which comprises a physical communications interface. The RAN 706 can include one or more network devices, such as base station 712 and base station 714, that enable the connection 708 and connection 710.

In this example, the connection 708 and connection 710 are air interfaces to enable such communicative coupling and may be consistent with RAT(s) used by the RAN 706, such as, for example, an LTE and/or NR.

In some embodiments, the UE 702 and UE 704 may also directly exchange communication data via a sidelink interface 716. The UE 704 is shown to be configured to access an access point (shown as AP 718) via connection 720. By way of example, the connection 720 can comprise a local wireless connection, such as a connection consistent with any IEEE 802.11 protocol, wherein the AP 718 may comprise a Wi-Fi® router. In this example, the AP 718 may be connected to another network (for example, the Internet) without going through a core network (CN) 724.

In some embodiments, the UE 702 and UE 704 can be configured to communicate using orthogonal frequency division multiplexing (OFDM) communication signals with each other or with the base station 712 and/or the base station 714 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 712 or base station 714 may be implemented as one or more software entities running on server computers as part of a virtual network. In addition, or in other embodiments, the base station 712 or base station 714 may be configured to communicate with one another via interface 722. In some embodiments where the wireless communication system 700 is an LTE system (e.g., when the CN 724 is an EPC), the interface 722 may be an X2 interface. The X2 interface may be defined between two or more network devices of a RAN (e.g., two or more eNBs and the like) that connect to an EPC, and/or between two eNBs connecting to the EPC. In some embodiments where the wireless communication system 700 is an NR system (e.g., when CN 724 is a 5GC), the interface 722 may be an Xn interface. The Xn interface is defined between two or more network devices of a RAN (e.g., two or more gNBs and the like) that connect to the 5GC, between a base station 712 (e.g., a gNB) connecting to the 5GC and an eNB, and/or between two eNBs connecting to the 5GC (e.g., CN 724).

The RAN 706 is shown to be communicatively coupled to the CN 724. The CN 724 may comprise one or more network elements 726, which are configured to offer various data and telecommunications services to customers/subscribers (e.g., users of UE 702 and UE 704) who are connected to the CN 724 via the RAN 706. The components of the CN 724 may be implemented in one physical device or separate physical devices including components to read and execute instructions from a machine-readable or computer-readable medium (e.g., a non-transitory machine-readable storage medium).

In some embodiments, the CN 724 may be an EPC, and the RAN 706 may be connected with the CN 724 via an S1 interface 728. In some embodiments, the S1 interface 728 may be split into two parts, an S1 user plane (S1-U) interface, which carries traffic data between the base station 712 or base station 714 and a serving gateway (S-GW), and an S1-MME interface, which is a signaling interface between the base station 712 or base station 714 and mobility management entities (MMEs).

In some embodiments, the CN 724 may be a 5GC, and the RAN 706 may be connected with the CN 724 via an NG interface 728. In some embodiments, the NG interface 728 may be split into two parts, an NG user plane (NG-U) interface, which carries traffic data between the base station 712 or base station 714 and a user plane function (UPF), and the S1 control plane (NG-C) interface, which is a signaling interface between the base station 712 or base station 714 and access and mobility management functions (AMFs).

Generally, an application server 730 may be an element offering applications that use internet protocol (IP) bearer resources with the CN 724 (e.g., packet switched data services). The application server 730 can also be configured to support one or more communication services (e.g., VoIP sessions, group communication sessions, etc.) for the UE 702 and UE 704 via the CN 724. The application server 730 may communicate with the CN 724 through an IP communications interface 732.

In some examples, the application server is a SPVS (e.g., SPVS 108), such that the UE 702 and/or the UE 704 may communicate with the SPVS via the RAN 706 and core network 724, as further described herein with reference to one or more of FIGS. 1-7.

Figure 8:
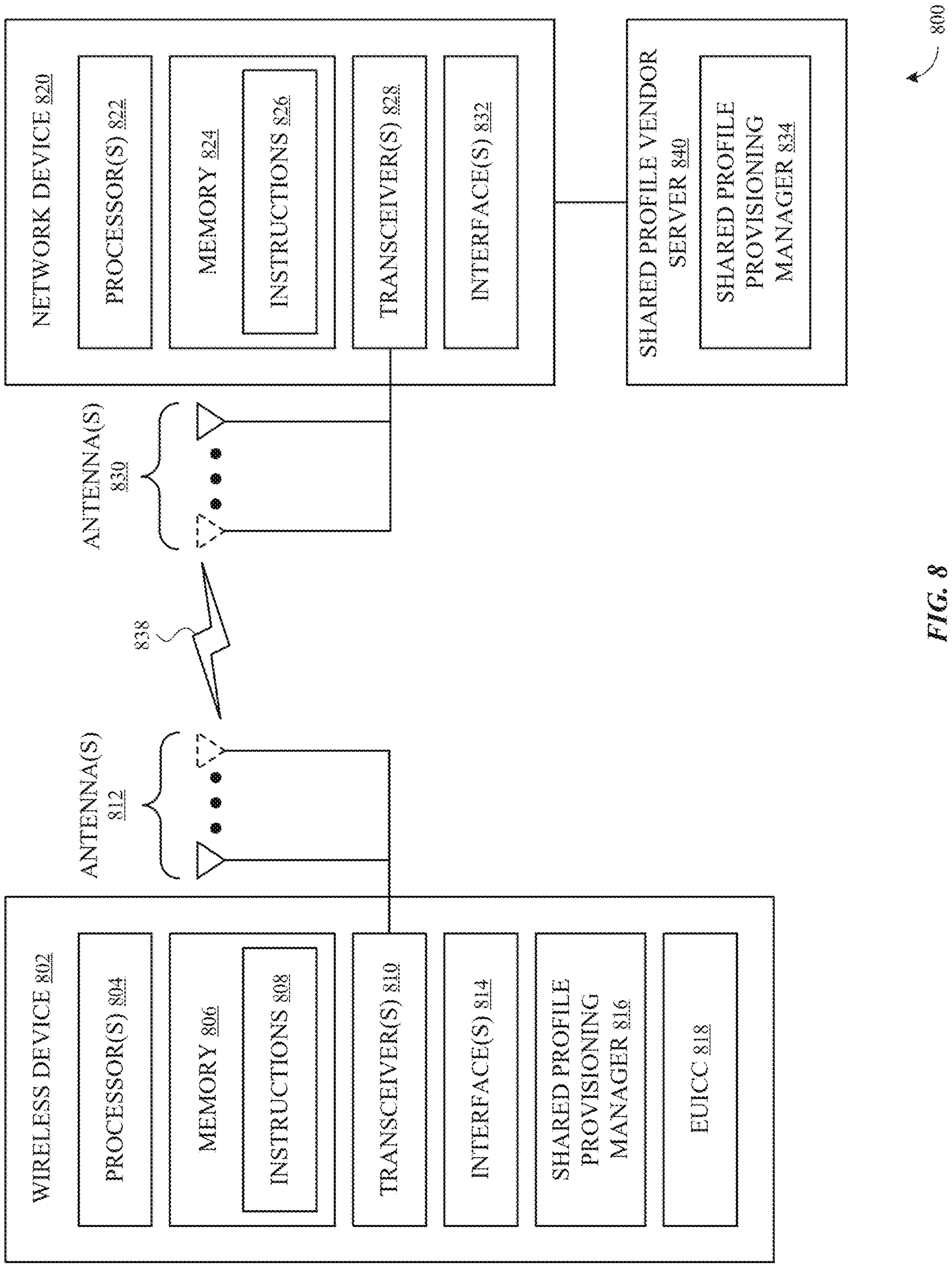
FIG. 8 illustrates an example system for performing signaling between a wireless device and a network device, according to one or more aspects described herein.

FIG. 8 illustrates an example system 800 for performing signaling 838 between a wireless device 802, a network device 820, and a SPVS 840 according to embodiments described herein. The system 800 may be a portion of a wireless communication system as herein described. The wireless device 802 may be, for example, a UE of a wireless communication system. The network device 820 may be, for example, a base station (e.g., an eNB or a gNB) or a radio head of a wireless communication system. The SPVS 840 may be, for example, network device or server operated by a third-party and accessible to the network device 820 over the Internet.

The wireless device 802 may include one or more processor(s) 804. The processor(s) 804 may execute instructions such that various operations of the wireless device 802 are performed, as described herein. The processor(s) 804 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 802 may include a memory 806. The memory 806 may be a non-transitory computer-readable storage medium that stores instructions 808 (which may include, for example, the instructions being executed by the processor(s) 804). The instructions 808 may also be referred to as program code or a computer program. The memory 806 may also store data used by, and results computed by, the processor(s) 804.

The wireless device 802 may include one or more transceiver(s) 810 (also collectively referred to as a transceiver 810) that may include a radio frequency (RF) transmitter and/or receiver circuitry that use the antenna(s) 812 of the wireless device 802 to facilitate signaling (e.g., the signaling 838) to and/or from the wireless device 802 with other devices (e.g., the network device 820) according to corresponding RATs.

The wireless device 802 may include one or more antenna(s) 812 (e.g., one, two, four, eight, or more). For embodiments with multiple antenna(s) 812, the wireless device 802 may leverage the spatial diversity of such multiple antenna(s) 812 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 802 may be accomplished according to precoding (or digital beamforming) that is applied at the wireless device 802 that multiplexes the data streams across the antenna(s) 812 according to known or assumed channel characteristics such that each data stream is received with an appropriate signal strength relative to other streams and at a desired location in the spatial domain (e.g., the location of a receiver associated with that data stream). Some embodiments may use single user MIMO (SU-MIMO) methods (where the data streams are all directed to a single receiver) and/or multi-user MIMO (MU-MIMO) methods (where individual data streams may be directed to individual (different) receivers in different locations in the spatial domain).

In some embodiments having multiple antennas, the wireless device 802 may implement analog beamforming techniques, whereby phases of the signals sent by the antenna(s) 812 are relatively adjusted such that the (joint) transmission of the antenna(s) 812 can be directed (this is sometimes referred to as beam steering).

The wireless device 802 may include one or more interface(s) 814. The interface(s) 814 may be used to provide input to or output from the wireless device 802. For example, a wireless device 802 that is a UE may include interface(s) 814 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 810/antenna(s) 812 already described) that allow for communication between the UE and other devices and may operate according to known protocols (e.g., Wi-Fi®, Bluetooth®, and the like).

The wireless device 802 may include shared profile provisioning manager 816. The shared profile provisioning manager 816 may be implemented via hardware, software, or combinations thereof. For example, the shared profile provisioning manager 816 may be implemented as a processor, circuit, and/or instructions 808 stored in the memory 806 and executed by the processor(s) 804. In some examples, the shared profile provisioning manager 816 may be integrated within the processor(s) 804 and/or the transceiver(s) 810. For example, the shared profile provisioning manager 816 may be implemented by a combination of software components (e.g., executed by a DSP or a general processor) and hardware components (e.g., logic gates and circuitry) within the processor(s) 804 or the transceiver(s) 810.

The shared profile provisioning manager 816 may be used for various aspects of the present disclosure, for example, aspects of FIGS. 1-8, from a wireless device or UE perspective. The shared profile provisioning manager 816 may be configured, for example, to perform transmitting, for receipt by a SPVS, a first message of a shared profile operational IMSI provisioning procedure, that includes a randomized IMSI for an eUICC; receiving, at least in part in response to the first message, a second message of the shared profile operational IMSI provisioning procedure, the second message comprising an indication of a time counter value; transmitting, at least in part in response to the time counter value determined to be valid and for receipt by the SPVS, a third message of the shared profile operational IMSI provisioning procedure; and receiving, at least in part in response to the third message, a fourth message of the shared profile operational IMSI provisioning procedure, the fourth message comprising a shared profile operational IMSI for the eUICC.

The eUICC 818 may be used for various aspects of the present disclosure, for example, aspects of FIGS. 1-8, from a wireless device or UE perspective. The eUICC 818 may be configured, for example, to perform receiving a request for a randomized IMSI; transmitting a randomized IMSI responsive to the request; receiving, at least in part in response to the randomized IMSI, an indication of an acq-IMSI, a time counter value, and a first nonce value associated with a shared profile operational IMSI provisioning procedure; determining whether the time counter value is valid; and receiving, based at least in part on a determination that the time counter value is valid, a shared profile operational IMSI for the eUICC.

The network device 820 may include one or more processor(s) 822. The processor(s) 822 may execute instructions such that various operations of the network device 820 are performed, as described herein. The processor(s) 822 may include one or more baseband processors implemented using, for example, a CPU, a DSP, an ASIC, a controller, an FPGA device, another hardware device, a firmware device, or any combination thereof configured to perform the operations described herein.

The network device 820 may include a memory 824. The memory 824 may be a non-transitory computer-readable storage medium that stores instructions 826 (which may include, for example, the instructions being executed by the processor(s) 822). The instructions 826 may also be referred to as program code or a computer program. The memory 824 may also store data used by, and results computed by, the processor(s) 822.

The network device 820 may include one or more transceiver(s) 828 (also collectively referred to as a transceiver 828) that may include RF transmitter and/or receiver circuitry that use the antenna(s) 830 of the network device 820 to facilitate signaling (e.g., the signaling 838) to and/or from the network device 820 with other devices (e.g., the wireless device 802) according to corresponding RATs.

The network device 820 may include one or more antenna(s) 830 (e.g., one, two, four, or more). In embodiments having multiple antenna(s) 830, the network device 820 may perform MIMO, digital beamforming, analog beamforming, beam steering, etc., as has been described.

The network device 820 may include one or more interface(s) 832. The interface(s) 832 may be used to provide input to or output from the network device 820. For example, a network device 820 of a RAN (e.g., a base station, a radio head, etc.) may include interface(s) 832 made up of transmitters, receivers, and other circuitry (e.g., other than the transceiver(s) 828/antenna(s) 830 already described) that enables the network device 820 to communicate with other equipment in a network, and/or that enables the network device 820 to communicate with external networks, computers, databases, and the like (e.g., the SPVS 840) for purposes of operations, administration, and maintenance of the network device 820 or other equipment operably connected thereto, and to convey messages between the wireless device 802 (including shared profile provisioning manager 816 and/or eUICC 818) and the SPVS 840.

The SPVS 840 may include one or more processor(s). The processor(s) may execute instructions such that various operations of the SPVS 840 is performed, as described herein. The processor(s) may include one or more processors implemented using, for example, a CPU, a DSP, an ASIC, a controller, an FPGA device, another hardware device, a firmware device, or any combination thereof configured to perform the operations described herein.

The SPVS 840 may include a memory. The memory may be a non-transitory computer-readable storage medium that stores instructions (which may include, for example, the instructions being executed by the processor(s)). The instructions may also be referred to as program code or a computer program. The memory may also store data used by, and results computed by, the processor(s).

The SPVS 840 may include at least one of shared profile provisioning manager 834. The shared profile provisioning manager 834 may be implemented via hardware, software, or combinations thereof. For example, the shared profile provisioning manager 834 may be implemented as a processor, circuit, and/or instructions stored in the memory of the SPVS 840 and executed by the processor(s) of the SPVS 840. In some examples, the shared profile provisioning manager 834 may be integrated within the processor(s). For example, the shared profile provisioning manager 834 may be implemented by a combination of software components (e.g., executed by a DSP or a general processor) and hardware components (e.g., logic gates and circuitry) within the processor(s).

The shared profile provisioning manager 834 may be used for various aspects of the present disclosure, for example, aspects of FIGS. 1-8, from a SPVS perspective.

For one or more embodiments, terms such as "first," "second," and so on, may be used to distinguish like or similar terms. It should be understood that such references are to distinguish between different instances of terms or components, and do not necessarily indicate a specific order or sequence of messages. For example, although referred to as a "first message," "second message," "third message," "fourth message," and so on, it should be understood that such references are to distinguish between different messages, and do not necessarily indicate a specific order or sequence of messages. For example, a quantity of one or more message may be communicated between the second message and the third message, or the third message and the fourth message.

For one or more embodiments, at least one of the components set forth in one or more of the preceding figures may be configured to perform one or more operations, techniques, processes, and/or methods as set forth herein. For example, a baseband processor (or processor) as described herein in connection with one or more of the preceding figures may be configured to operate in accordance with one or more of the examples set forth herein. For another example, circuitry associated with a UE, network device, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description but is not intended to be exhaustive or to limit the scope of embodiments to the precise form described. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

The systems described herein pertain to specific embodiments but are provided as examples. These embodiments can be combined into single systems, partially combined into other systems, split into multiple systems, or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

Although the foregoing has been described in some detail for purposes of clarity, it will be apparent that changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein but may be modified within the scope and equivalents of the appended claims.

The invention claimed is:

1. A method of wireless communication at an embedded universal integrated circuit card (eUICC), comprising:

receiving a request for a randomized international mobile subscriber identity (IMSI);

transmitting a randomized IMSI responsive to the request;

receiving, at least in part in response to the request for the randomized IMSI, an indication of a time counter value and a first nonce value associated with a shared profile operational IMSI provisioning procedure;

determining whether the time counter value and the first nonce value are valid;

determining, based at least in part on the time counter value and the first nonce value, whether a message comprising the indication of the time counter value and the first nonce value is accepted for processing;

determining, based at least in part on the acceptance of the message for processing, whether the subsequent messages should be generated or accepted for processing; and receiving, based at least in part on a determination that the time counter value and the first nonce value are valid, a shared profile operational IMSI for the eUICC.

2. The method of claim 1, wherein determining whether the time counter value is valid comprises:

comparing the indicated time counter value with a second time counter value stored at the eUICC prior to the receipt of the request for the randomized IMSI;

determining that the indicated time counter value and the first nonce value are invalid based at least in part on the indicated time counter value being older than the second time counter value; and transmitting a failure message that indicates that the indicated time counter value and the first nonce value are invalid.

3. The method of claim 1, further comprising:

comparing the indicated time counter value and the first nonce value with a second time counter value and a second nonce value stored at the eUICC prior to the receipt of the request for the randomized IMSI;

determining that the indicated time counter value is invalid based at least in part on both the first nonce value and the second nonce value having a same value, and the indicated time counter value and the second time counter value having a same value; and transmitting a failure message that indicates that the indicated time counter value is invalid.

4. The method of claim 1, further comprising:

determining, based at least in part on receiving the indicated time counter value and the first nonce value, that a threshold quantity of time counter value-nonce value tuples has been exceeded;

determining that the indicated time counter value is invalid based at least in part on the threshold quantity of time counter value-nonce value tuples having been exceeded; and transmitting a failure message that indicates that the indicated time counter value is invalid.

5. The method of claim 1, further comprising:

transmitting, based at least in part on the determination that the time counter value is valid, a message for receipt by a bootstrap vendor server; and receiving, at least in part in response to the message, the shared profile operational IMSI from the bootstrap vendor server.

6. The method of claim 1, further comprising:

receiving a plurality of messages associated with the shared profile operational IMSI provisioning procedure and including a plurality of tuples, each tuple of the plurality of tuples including a time counter value, a nonce value, and a randomized IMSI for the message;

storing the plurality of tuples at the eUICC; and comparing the time counter value with the plurality of tuples to determine whether the time counter value is valid.

7. The method of claim 1, further comprising:

obtaining a first key of a key pair, wherein a second key of the key pair is known to a bootstrap vendor server that provides the shared profile operational IMSI; and decrypting, by the eUICC and using the first key, a message that comprises the indication of the time counter value associated with the shared profile operational IMSI provisioning procedure to obtain the time counter value.

8. The method of claim 1, further comprising:

generating the randomized IMSI, wherein the eUICC checks a set of time counter value-nonce value tuples such that the randomized IMSI is not in the set of time counter value-nonce value tuples.

9. The method of claim 1, wherein the eUICC determines whether the time counter value and the first nonce value are valid without a UE that includes the eUICC validating the time counter value.

10. An embedded universal integrated circuit card (eUICC) comprising a memory and configured to:

receive a request for a randomized international mobile subscriber identity (IMSI);

transmit a randomized IMSI responsive to the request;

receive, at least in part in response to the request for the randomized IMSI, an indication of a time counter value associated with a shared profile operational IMSI provisioning procedure;

determine whether the time counter value and a first nonce value are valid;

determine, based at least in part on the time counter value and the first nonce value, whether a message comprising the indication of the time counter value and the first nonce value is accepted for processing;

determine, based at least in part on the acceptance of the message for processing, whether the subsequent messages should be generated or accepted for processing; and receive, based at least in part on a determination that the time counter value and the first nonce value are valid, a shared profile operational IMSI for the eUICC.

11. The eUICC of claim 10, further configured to:

compare the indicated time counter value with a second time counter value stored at the eUICC prior to the receipt of the request for the randomized IMSI;

determine that the indicated time counter value and the first nonce value are invalid based at least in part on the indicated time counter value being older than the second time counter value; and transmit a failure message that indicates that the indicated time counter value and the first nonce value are invalid.

12. The eUICC of claim 10, further configured to:

compare the indicated time counter value and the first nonce value with a second time counter value and a second nonce value stored at the eUICC prior to the receipt of the request for the randomized IMSI;

determine that the indicated time counter value is invalid based at least in part on both the first nonce value and the second nonce value having a same value, and the indicated time counter value and the second time counter value having a same value; and transmit a failure message that indicates that the indicated time counter value is invalid.

13. The eUICC of claim 10, further configured to:

determine, based at least in part on receiving the indicated time counter value and the first nonce value, that a threshold quantity of time counter value-nonce value tuples has been exceeded;

determine that the indicated time counter value is invalid based at least in part on the threshold quantity of time counter value-nonce value tuples having been exceeded; and transmit a failure message that indicates that the indicated time counter value is invalid.

14. The eUICC of claim 10, further configured to:

transmit, based at least in part on the determination that the time counter value is valid, a message for receipt by a bootstrap vendor server; and receive, at least in part in response to the message, the shared profile operational IMSI from the bootstrap vendor server.

15. The eUICC of claim 10, further configured to:

receive a plurality of messages associated with the shared profile operational IMSI provisioning procedure and including a plurality of tuples, each tuple of the plurality of tuples including a time counter value, a nonce value, and a randomized IMSI for the message;

store the plurality of tuples at the eUICC; and compare the time counter value with the plurality of tuples to determine whether the time counter value is valid.

16. The eUICC of claim 10, further configured to:

obtain a first key of a key pair, wherein a second key of the key pair is known to a bootstrap vendor server that provides the shared profile operational IMSI; and decrypt, by the eUICC and using the first key, a message that comprises the indication of the time counter value associated with the shared profile operational IMSI provisioning procedure to obtain the time counter value.

17. The eUICC of claim 10, further configured to:

generate the randomized IMSI, wherein the eUICC checks a set of time counter value-nonce value tuples such that the randomized IMSI is not in the set of time counter value-nonce value tuples.

18. A non-transitory computer-readable media storing instructions to cause an embedded universal integrated circuit card (eUICC) to:

receive a request for a randomized international mobile subscriber identity (IMSI);

transmit a randomized IMSI responsive to the request;

receive, at least in part in response to the request for the randomized IMSI, an indication of a time counter value and a first nonce value associated with a shared profile operational IMSI provisioning procedure;

determine whether the time counter value and the first nonce value are valid;

determine, based at least in part on the time counter value and the first nonce value, whether a message comprising the indication of the time counter value and the first nonce value is accepted for processing determine, based at least in part on the acceptance of the message for processing, whether the subsequent messages should be generated or accepted for processing; and receive, based at least in part on a determination that the time counter value and the first nonce value are valid, a shared profile operational IMSI for the eUICC.

19. The non-transitory computer-readable media of claim 18, wherein the instructions further cause the eUICC to:

compare the indicated time counter value with a second time counter value stored at the eUICC prior to the receipt of the request for the randomized IMSI;

determine that the indicated time counter value and the first nonce value are invalid based at least in part on the indicated time counter value being older than the second time counter value; and transmit a failure message that indicates that the indicated time counter value and the first nonce value are invalid.

20. The non-transitory computer-readable media of claim 18, wherein the instructions further cause the eUICC to:

receive a plurality of messages associated with the shared profile operational IMSI provisioning procedure and including a plurality of tuples, each tuple of the plurality of tuples including a time counter value, a nonce value, and a randomized IMSI for the message;

store the plurality of tuples at the eUICC; and compare the time counter value with the plurality of tuples to determine whether the time counter value is valid.

* * * * *